United States Patent
Naden et al.

(10) Patent No.: US 6,973,476 B1
(45) Date of Patent: Dec. 6, 2005

(54) SYSTEM AND METHOD FOR COMMUNICATING DATA VIA A WIRELESS HIGH SPEED LINK

(75) Inventors: Rex A. Naden, Los Gatos, CA (US); Masoud Zargari, Mountain View, CA (US)

(73) Assignee: Atheros Communications, Palo Alto, CA (US)

( * ) Notice: Subject to any disclaimer, the term of this patent is extended or adjusted under 35 U.S.C. 154(b) by 0 days.

(21) Appl. No.: 09/523,573

(22) Filed: Mar. 10, 2000

(51) Int. Cl.[7] ............................................. G06F 15/16
(52) U.S. Cl. ...................... 709/203; 709/216; 709/217; 455/345
(58) Field of Search .............................. 709/200–203, 709/216–219; 701/1, 35, 200, 2; 455/345, 455/66

(56) References Cited

U.S. PATENT DOCUMENTS

| | | | | |
|---|---|---|---|---|
| 5,572,442 A | | 11/1996 | Schulhof et al. ............ | 709/219 |
| 5,721,827 A | | 2/1998 | Logan et al. ................ | 709/217 |
| 5,732,216 A | * | 3/1998 | Logan et al. ................ | 709/203 |
| 5,742,893 A | | 4/1998 | Frank ........................... | 455/66 |
| 5,914,941 A | | 6/1999 | Janky .......................... | 709/219 |
| 6,370,449 B1 | * | 4/2002 | Razavi et al. .................. | 701/1 |
| 6,374,177 B1 | * | 4/2002 | Lee et al. .................... | 701/200 |
| 6,377,825 B1 | * | 4/2002 | Kennedy et al. ............. | 455/569 |
| 6,446,118 B1 | * | 9/2002 | Gottlieb ...................... | 709/217 |
| 6,507,764 B1 | * | 1/2003 | Parrella et al. .............. | 709/200 |

FOREIGN PATENT DOCUMENTS

| | | | | |
|---|---|---|---|---|
| EP | 0 831 608 | | 3/1998 | ............ H04N 1/00 |
| GB | 2 304 489 | | 3/1997 | .......... H04M 11/08 |

* cited by examiner

*Primary Examiner*—Bharat Barot
(74) *Attorney, Agent, or Firm*—Rosenberg, Klein & Lee

(57) ABSTRACT

A high-speed wireless link communicates data between a central storage system and a mobile remote system. The wireless link further communicates data between two mobile remote systems. Both the central storage system and the mobile remote system include a central processor, a memory, a transceiver, and a means for data output. The high-speed wireless link is established between the transceivers. Data are loaded, processed and stored on the central storage system. The data, including musical data in MP3 format, are automatically downloaded at high transmission speeds from the central storage system to the mobile remote system.

34 Claims, 1 Drawing Sheet

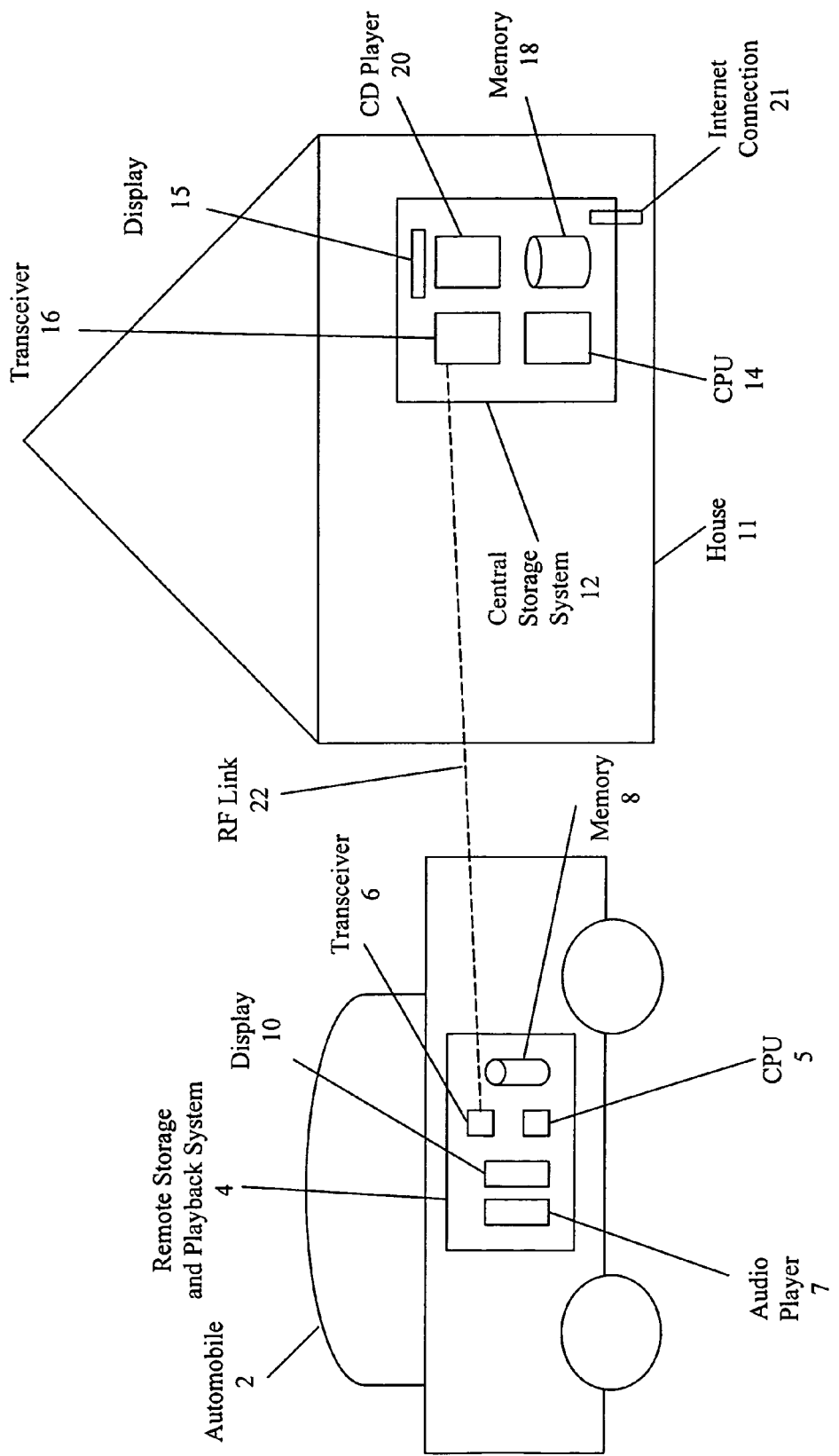

SYSTEM AND METHOD FOR COMMUNICATING DATA VIA A WIRELESS HIGH SPEED LINK

BACKGROUND OF THE INVENTION

1. Field of Invention

The present invention relates to wireless link and more particularly to a low-cost high-speed wireless link that may be used in an automobile.

2. Description of Related Art

Without the availability of a low-cost high-speed wireless link, the transfer of data between an automobile and other information sources is cumbersome, particularly with regards to pre-recorded music. Transferring pre-recorded consumer music to an automobile may be done by writing the music to an audiotape, which has generally low fidelity, and then transferring the tape to the automobile, where it can be played by means of a tape player. The use of pre-recorded CD's generally eliminates consumer editorial choice in the recording unless specialized recording equipment is used.

Even when a movable storage medium such as cassette or CD is used to transfer recorded music to an automobile, other related problems arise. For example, the devices storing music may be cumbersome to store in the automobile. These storage devices may be awkward to play, for example, requiring loading in a carousel mounted in the trunk of the automobile. Additionally the driver of the automobile may be distracted by the necessary manipulation of the devices. Furthermore, access to the music will be limited so that the listener will not have ready access to recordings for example from music databases such as those found on the Internet in MP3 or other formats, Internet streaming audio music and other programs, and those recordings created in MP3 by the user on his PC from his own CD collection.

Similar considerations apply to other non-musical data such as educational programs, news programs, audio books, and entertainment recordings not available through commercial AM/FM sources. Additionally, other relevant data for transmission to and from a vehicle may include data related to the automobile's functioning (e.g., payment authority for operational purposes such as gasoline or car wash purposes, payment authority for purchases of music, maintenance records, performance data, tire pressures, fluid levels), the driver's personal databases (e.g., cell phone directories, personal organizer calendars and directories), and other databases related to the driver (e.g., bridge and highway toll information, proof of insurance, proof of ownership or state registration, parking lot and space authorizations, the driver's home security system).

SUMMARY OF THE INVENTION

Accordingly, it is an object of this invention to provide a low-cost wireless link that can be used for communication between a fixed unit and a mobile unit or between two mobile units.

It is a further object of this invention to provide a low-cost high-speed wireless link that can be used for automatic downloading of data to and from an automobile, or between automobiles, and for storing such data on inexpensive highly compact (e.g., PC-card size) memories including miniature high-density hard disc drives or flash memory cards including the storage devices that are used for digital photography.

It is a further object of this invention to provide a low-cost high-speed wireless link that can be used for automatic downloading of encoded music from a fixed base unit to mobile unit mounted in an automobile, or between two mobile units.

A preferred embodiment of the invention includes a remote music storage and playback system having a first memory and a central music storage system having a second memory. The central music storage system operates to store data on the second memory and contains a transmitter for transmitting the music stored in the second memory to a receiver associated with the remote music storage and playback system. The remote music and storage playback system receives the transmitted music, stores it on the first memory and is capable of playback of the music stored thereon.

The remote music storage and playback system may include a transmitter that operates to transmit a request signal to the central music storage system. The central music storage system then responds to receiving the request signal at a receiver included in the central music storage system by accessing a data file associated with the received request signal on the second memory and transmitting the data file to the remote music storage and playback system.

The remote music and storage playback system is preferably mounted in mobile vehicle such as an automobile. The central music storage system is preferably mounted in a convenient fixed location such as a house or gasoline filling station that allows the remote music and storage playback system to come within a predetermined distance of it, as for example when the automobile is parked near the house. This allows for the efficient transfer of data files, such as music encoded in MP3 or some other convenient format, in a relatively short period of time and, according to the schedule of the user, for example, on a daily basis when the user arrives at his home in the evening.

These and other objects and advantages of the invention will become more apparent and more readily appreciated from the following detailed description of the presently preferred exemplary embodiments of the invention taken in conjunction with the accompanying drawings.

BRIEF DESCRIPTION OF THE DRAWINGS

FIG. 1 is a diagram of a preferred embodiment of the present invention as used with an automobile.

DETAILED DESCRIPTION OF THE PRESENTLY PREFERRED EXEMPLARY EMBODIMENT

The diagram of a preferred embodiment of the wireless link of the present invention in FIG. 1 includes an automobile 2 that includes a remote music storage and playback system 4 having a CPU (central processing unit) 5, a transceiver 6, an audio player 7, a memory 8, and a display 10. In a fixed location, such as a house, there is a central storage system 12, which includes a CPU 14 with a display 15, a transceiver 16, a memory 18, a CD (compact disk) player 20, and an Internet connection 21.

An RF (radio frequency) link 22 provides a low-cost high-speed connection between transceiver 6 and transceiver 16 that can efficiently operate at distances of up to 100 meters. Link 22 enables the automatic downloading of music from central storage system 12 to remote system 4, where it may be played using player 7. Preferably the music is encoded in a format such as MP3 so that the data is compressed although any formatting means is compatible with the present invention. In a preferred embodiment the data transfer rate across link 22 is approximately 50 Mbits/sec. One minute of music encoded in MP3 requires approximately 8 Mbits of storage. Therefore, a three-minute song requires approximately 0.48 seconds for transfer and an hour's music requires approximately 10 secondsThree hours of music may be stored on a 180 Mbyte high-density storage volume such as flash or compact hard disc.

Prior to transmission across link 22, music may be loaded onto central storage system 12 and stored at memory 18 from a variety of sources including CD player 20 and Internet connection 21. CPU 14 may encode the music (e.g., in MP3 format) before storage at memory 18. For example, the music for a CD track may be obtained via Internet connection 21 from Web directories that store extensive libraries of CD's in MP3 format. Alternatively, CPU 14 may transform music obtained from CD player 20 (or some other digital or analog source) to MP3 format. Alternatively, CPU 14 may transcribe Internet streaming audio program information such as that offered by KDFC or many other sources.

Transceiver 16 operates to transmit MP3-formatted music data across link 22 to remote system 4 for storage in memory 8. Music stored in memory 8 may then be played in automobile 2 by means of audio player 7, which is compatible with MP3-formatted music. Display 10 may include information pertaining to the source of the music (e.g., names of CD, track and performer, or name of play list or type). Memory 8 (as well as memory 18) may include a variety of storage media including high-density disks and flash memory.

While a high speed link is implemented only from central storage system 12 to remote system 4 in one embodiment of the invention, the invention may also include such a link from remote system 4 to central storage system 12. Then music received at remote system 4 from other sources (e.g. FM radio transmission) may be MP3-encoded at CPU 5, stored at memory 8, and transmitted across link 22 for storage at memory 18 when central storage system 12 and remote system 4 are within the predetermined distance ranges as discussed above.

Software processes executing on CPU 14 facilitate the encoding of audio data as well as the queuing and formatting of data for transmission via transceiver 16 across link 22. Such software processes can be designed in many ways known in the art in accordance with the teachings of this invention. Similarly, software processes (or equivalent firmware) executing on CPU 5 also facilitate the encoding of audio data as well as the queuing and formatting of data for transmission via transceiver 6 across link 22.

One such software process executing on CPU 14 may be an agent process that continuously collects music selections based upon a predetermined set of preferences that are either entered explicitly by the user or learned by the software process based upon the user's typical selections. Sources to be searched include music formerly entered into memory 18 by the user, websites operated by new artists wishing to showcase their work, fee-based subscription music services, streaming audio sources, and radio or TV broadcast in FM or AM format. This type of agent software has been applied to television systems as described by Nicholas Negroponte in "Being Digital" (Vintage Books, 1996). Personal video recording systems utilizing agent software have also been developed for example by TiVO, Inc. Operating such an agent software process enables the construction of a personalized music collection that is tailored to the interests of the owner. One output of such a system may be "playlists" that are designed to appeal to different moods of the user (e.g., for the beach, commuting, or a long trip) or based upon different genres (e.g., classical, rap, rock, folk, or country). The agent software may include thresholds that determine when a communication action will be carried out (e.g., when a threshold number of programs have been added to the "playlist").

Transmission across link 22 may be initiated automatically. When remote system 4 is within the range mentioned above, then remote system 4 may initiate transmission across link 22 so long as central storage system 12 is operating or can be turned on. For example, an operator may establish a file of MP3-formatted music on system 12. Then a transfer action may be queued up upon prior command from either remote system 4 or central system 12 so that when the automobile 2 is within range the transfer commences. In a preferred embodiment, transceiver 16 has a separate power source that is continuously on, and transceiver 16 powers up other components of central storage system 12 when communication with transceiver 6 is established. (For example, Ethernet adapters are available where a host computer will "wake up" upon receipt of a designated network-originated command.)

In the preferred embodiment, transceivers 6 and 16 continuously monitor their common RF channel searching for the presence of signal strength adequate to establish a robust RF link. Such signal strength is present when the transceivers are sufficiently close to one another. When this link is established, software running in transceiver 16 instructs the central system's power unit to power up and commence a RF download process to remote transceiver 6.

The signal transmitted from transceiver 6 may include a request list that includes identifiers for music or other programs to be transmitted. This request list may be generated automatically or in a hands-free mode in automobile 2, for example, by a voice-activated system. Then central system 12 operates to include the requested items in data transmitted by transceiver 16. The distance sufficiently close for transmission may vary according to the operating frequencies used. Link 22 may have a relatively short range so that it may be implemented relatively inexpensively using an unlicensed spectrum (e.g., 2.4 GHz or one of three 5 GHz UNII bands). However, a substantially greater distance is desirable so as to enhance the usefulness of the system. Such distances may be enabled by the use of directional RF antennas that multiply the effective radiated power significantly. Such antennas may be either of conventional passive construction or of active construction, utilizing for example an array of phased elements.

Transceiver 6 and transceiver 16, which determine link 22, are available from conventional technology. For example, the Hyperlan (High Performance Radio Local Area Network) standard can provide a preferred embodiment of link 22 with a maximal data rate in the range of 20–54 Mbits/sec. ("HIPERLAN: the high performance radio local area network standard", Hallis, G. A., Electronics & Communications Engineering Journal, December 1994, pp. 289–296; "HiperLAN/2—The Broadband Radio Transmission Technology Operating in the 5 GHz Frequency Band", M. Johnsson, HiperLAN/2 Global Forum, 1999.) The preferred transmission frequency bands are in the UNII band at approximately 5 GHz and the distances correspondingly enabled by such frequency bands are from 10 to 100 M, depending upon the number and construction of walls in the path of RF link 22.

RF link 22 provides a low-cost high-speed wireless link that may be used to transmit a variety of data from central storage system 12 to remote system 4 in addition to audio data. Examples of data that may be sent from central storage system 12 include: calendars and cell phone directories that may be automatically downloaded and synchronized, video data for viewing by a monitor in automobile, mapping data to update a automobile-mapping system in the automobile, telephone conversations, Internet pages, e-mail data, and control data for the automobile, including information related to starting the engine and checking the oil.

Likewise RF link 22 can also provide a low-cost high-speed wireless link that may be used to transmit a variety of data from remote system 4 to central storage 12 in addition to audio data. Examples of data that may be sent from remote system 4 include: video data captured by a camera in automobile for viewing elsewhere, and control data for the house including information related to appliances, such as starting a microwave oven or setting a VCR.

Additional embodiments of the present invention involve alternatives to components within central storage system 12. For example, an enhanced PC may include all functions of central storage system 12. Furthermore, with the convergence of the functionalities of PC's and TV's, a TV with enhanced functionalities in accordance with the invention could be substituted for central storage system 12. Additionally, a second automobile may include central storage system 12 so as to enable the transfer of data between automobiles, including but not limited to musical data. Additionally, a portable music player or "boom box" may be substituted for remote system 4, thereby enhancing the mobility of the present invention.

In addition to a dwelling unit such as a home, central storage system 12 may be included in a commercial unit such as a gasoline filling station or a convenience store. Then when remote system 4 is mounted in a vehicle that passes the commercial unit, data including musical data may be transferred automatically possibly with some incorporated payment option. A network of fixed units (including both commercial units and dwelling units) may be used to dispense data to customers in a seamless way across a highway system.

Although only certain embodiments of this invention have been described in detail above, those skilled in the art will readily appreciate that many modifications are possible in the exemplary embodiment without materially departing from the novel teachings and advantages of this invention. Accordingly, all such modifications are intended to be included within the scope of this invention.

What is claimed is:

1. A communications system, comprising:
   a first unit including a first transceiver, a first memory and a first CPU, the first CPU operating to access data at the first transceiver and at the first memory; and,
   a second unit including a second transceiver for operable coupling to the first transceiver over a direct wireless link therewith, a second memory and a second CPU, the second CPU operating to access data at the second transceiver and at the second memory, wherein
   the first CPU is preconfigured to operate in proximity-responsive manner to automatically transmit without user intervention a request signal from the first transceiver to the second transceiver over the wireless link,
   the second CPU responds to receiving the request signal at the second transceiver by accessing a data file at the second memory and transmitting the data file from the second transceiver to the first transceiver over the wireless link, and
   the first CPU responds to receiving the data file at the first transceiver by storing the data file at the first memory.

2. A communications system, as claimed in claim 1, wherein at least one of the first unit and the second unit is included in a vehicle, the wireless link being established responsive to the first and second units being disposed within a predetermined proximity one relative to the other.

3. A communications system, as claimed in claim 1, wherein
   the data file includes MP3-formattted music, and
   the first unit includes a music player.

4. A communications system, as claimed in claim 3, wherein
   at least one of the first unit and the second unit is included in a vehicle.

5. A communications system, as claimed in claim 1, wherein
   the request signal includes a request list, the request list comprising an identifier for a program, and
   the data file accessed by the second CPU includes data for the program identified by the identifier.

6. A communications system, as claimed in claim 5, wherein
   at least one of the first unit and the second unit is included in a vehicle, and
   the request list is generated by a voice-activated system.

7. A communications system, as claimed in claim 6, wherein
   the data file includes MP3-formattted music, and
   the first unit includes a music player.

8. A communications system, as claimed in claim 1, wherein the request signal is sent in a continuous mode, and
   the second transceiver responds to receiving the request signal when the request signal is received at a sufficient strength.

9. A communications system, as claimed in claim 8, wherein at least one of the first unit and the second unit is included in a vehicle, the wireless link being established directly between the first and second units proximity-responsive manner.

10. A communications system, as claimed in claim 9, wherein the data file includes MP3-formattted music, and
    the first unit includes a music player.

11. A communications system, comprising:
    a first unit including a receiver, a first memory and a first CPU, the first CPU operating to access data at the receiver and at the first memory; and
    a second unit including a transmitter for operable coupling to the receiver over a direct wireless link, a second memory and a second CPU, the second CPU being preconfigured to operate in proximity-responsive manner to automatically access data at the transmitter and at the second memory without user intervention for transmission to the receiver over the wireless link, wherein
    the second CPU includes an agent program that generates a request signal,
    the second CPU responds to the request signal by selectively accessing a data file at the second memory and transmitting the data file from the transmitter to the receiver over the wireless link, and
    the first CPU responds to receiving the data file at the receiver by storing the data file at the first memory.

12. A communications system, as claimed in claim 11, wherein at least one of the first unit and the second unit is included in a vehicle.

13. A communications system, as claimed in claim 11, wherein
    the data file includes MP3-formattted music, and
    the first unit includes a music player.

14. A communications system, as claimed in claim 13, wherein at least one of the first unit and the second unit is included in a vehicle.

15. A communications system, as claimed in claim 11, wherein
the request signal includes a request list, the request list comprising an identifier for a program, and
the data file accessed by the second CPU includes data for the program identified by the identifier.

16. A communications system, as claimed in claim 15, wherein
at least one of the first unit and the second unit is included in a vehicle, and
the request list is generated by a voice-activated system.

17. A communications system, as claimed in claim 16, wherein
the data file includes MP3-formattted music, and
the first unit includes a music player.

18. A communications system, as claimed in claim 11, wherein
the second CPU responds to the request signal when the request signal satisfies a request threshold.

19. A communications system, as claimed in claim 18, wherein at least one of the first unit and the second unit is included in a vehicle, the wireless link being an RF link.

20. A communications system, as claimed in claim 19, wherein
the data file includes MP3-formattted music, and
the first unit includes a music player.

21. A method for communicating between a first storage unit and a second storage unit, comprising:
automatically generating a request signal based on program content;
sending the request signal from the first storage unit to the second storage unit, the first storage unit being preconfigured to operate in proximity-responsive manner to automatically send without user intervention the request signal from the first storage unit to the second storage unit over a direct wireless link established therebetween;
accessing a data file at the second storage unit and transmitting the data file from the second storage unit to the first storage unit over the wireless link, the second storage unit having received the request signal; and
storing the data file at the first storage unit, the first storage unit having received the data file from the second storage unit.

22. A method, as claimed in claim 21, wherein at least one of the first storage unit and the second storage unit is included in a vehicle.

23. A method, as claimed in claim 21, wherein
the data file includes MP3-formattted music, and
the first storage unit includes a music player.

24. A method, as claimed in claim 23, wherein at least one of the first storage unit and the second storage unit is included in a vehicle.

25. A method, as claimed in claim 21, wherein
the request signal includes a request list, the request list comprising an identifier for a program, and
the data file accessed by the second storage unit includes data for the program identified by the identifier.

26. A method, as claimed in claim 25, wherein
at least one of the first storage unit and the second storage unit is included in a vehicle, and
the request list is generated by a voice-activated system.

27. A method, as claimed in claim 26, wherein
the data file includes MP3-formattted music, and
the first storage unit includes a music player.

28. A method, as claimed in claim 21, wherein
the request signal is sent in a continuous mode, and
the second storage unit responds to receiving the request signal when the request signal is received at a sufficient strength.

29. A method, as claimed in claim 28, wherein at least one of the first storage unit and the second storage unit is included in a vehicle.

30. A method, as claimed in claim 29, wherein
the data file includes MP3-formattted music, and
the first storage unit includes a music player.

31. A method, as claimed in claim 28, wherein
the first storage unit is included in a vehicle; and
the second storage unit is included in a fixed unit.

32. A method, as claimed in claim 31, wherein
the data file includes MP3-formattted music, and
the first storage unit includes a music player.

33. A method, as claimed in claim 32, wherein the fixed unit is a dwelling unit.

34. A method, as claimed in claim 32, wherein the fixed unit is a commercial unit.

* * * * *